United States Patent
Shimoda et al.

(10) Patent No.: US 10,668,784 B2
(45) Date of Patent: Jun. 2, 2020

(54) FORCED-VENTILATION DEVICE

(71) Applicant: DENSO CORPORATION, Kariya, Aichi-pref. (JP)

(72) Inventors: Toshifumi Shimoda, Kariya (JP); Michiru Takahashi, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 459 days.

(21) Appl. No.: 15/519,498

(22) PCT Filed: Oct. 29, 2015

(86) PCT No.: PCT/JP2015/005440
§ 371 (c)(1),
(2) Date: Apr. 14, 2017

(87) PCT Pub. No.: WO2016/072069
PCT Pub. Date: May 12, 2016

(65) Prior Publication Data
US 2017/0225541 A1 Aug. 10, 2017

(30) Foreign Application Priority Data
Nov. 4, 2014 (JP) .................................. 2014-224474

(51) Int. Cl.
*B60H 1/00* (2006.01)
*B60H 1/24* (2006.01)
*H04W 4/80* (2018.01)

(52) U.S. Cl.
CPC ..... *B60H 1/00821* (2013.01); *B60H 1/00778* (2013.01); *B60H 1/00828* (2013.01);
(Continued)

(58) Field of Classification Search
CPC ............ B60H 1/00778; B60H 1/00821; B60H 1/00828; B60H 1/24; B60H 1/242; B60H 1/248
(Continued)

(56) References Cited

U.S. PATENT DOCUMENTS

| 5,167,129 A | 12/1992 | Akasaka |
| 6,924,735 B2 * | 8/2005 | Ueda ........................ E05B 77/48 307/10.1 |
| 2006/0196652 A1 | 9/2006 | Nagayama et al. |

FOREIGN PATENT DOCUMENTS

| JP | H03038425 A | 2/1991 | |
| JP | H0549421 U * | 6/1993 | ............... B60H 1/24 |

(Continued)

*Primary Examiner* — Edelmira Bosques
*Assistant Examiner* — Dana K Tighe
(74) *Attorney, Agent, or Firm* — Harness, Dickey & Pierce, P.L.C.

(57) ABSTRACT

A forced-ventilation device ventilates a compartment of a vehicle by forced ventilation by actuating a blower of an air-conditioning device of the vehicle when the compartment is left at a high temperature. When a mode for forced ventilation has been set by the user, when a mobile device approaching the vehicle together with a user enters a predetermined detection area within which the mobile device is detectable by a response signal, and when the response signal is successfully verified, a control portion switches ON an ignition switch of the vehicle, opens one or two or more windows using an opening and closing mechanism, and directs the air-conditioning device to actuate the blower.

9 Claims, 5 Drawing Sheets

(52) U.S. Cl.
CPC ............... *B60H 1/24* (2013.01); *B60H 1/248* (2013.01); *B60H 1/242* (2013.01); *H04W 4/80* (2018.02)

(58) Field of Classification Search
USPC .......................................................... 454/75
See application file for complete search history.

(56) References Cited

FOREIGN PATENT DOCUMENTS

| | | | |
|---|---|---|---|
| JP | H07137529 | A | 5/1995 |
| JP | 2825335 | B2 | 11/1998 |
| JP | 2002029385 | A | 1/2002 |
| JP | 2005206135 | A | 8/2005 |
| JP | 2006273299 | A | 10/2006 |
| JP | 2007276698 | A | 10/2007 |
| JP | 2013193723 | A | 9/2013 |

* cited by examiner

FORCED-VENTILATION DEVICE

CROSS REFERENCE TO RELATED APPLICATIONS

This application is a U.S. National Phase Application under 35 U.S.C. 371 of International Application No. PCT/JP2015/005440 filed on Oct. 29, 2015 and published in Japanese as WO 2016/072069 A1 on May 12, 2016. This application is based on and claims the benefit of priority from Japanese Patent Application No. 2014-224474 filed on Nov. 4, 2014. The entire disclosures of all of the above applications are incorporated herein by reference.

TECHNICAL FIELD

The present disclosure relates to a forced-ventilation device using a smart entry system which locks and unlocks a vehicle door.

BACKGROUND ART

An automobile forced-ventilation device in the related art is described in, for example, Patent Document 1. In response to a ventilation instruction signal from a keyless entry device, the forced-ventilation device described in Patent Document 1 outputs a control command to start forded-ventilation to a power window motor of a power window device, a blower motor of an air-conditioning device, and an inside and outside air switching actuator of the air-conditioning device. According to the control command, a glass window is rolled down to let air flow through by introducing outside air. A compartment is thus forcibly ventilated.

The forced-ventilation device outputs the ventilation instruction signal when remotely operated by a user via a remote-control transmitter provided to the keyless entry device.

The forced-ventilation device thus allows the user to lower a compartment temperature before the user gets in a vehicle which has become hot due to parking in the hot sun.

The forced-ventilation device described in Patent Document 1, however, uses the keyless entry device. That is, the user is required to operate the remote-control transmitter each time the compartment is ventilated. In addition, the forced-ventilation device described in Patent Document 1 is operated by the remote-control transmitter (by remote control) far from the vehicle. Hence, the glass window is rolled down even when the user himself is not around the vehicle, in which case security may be endangered.

PRIOR ART DOCUMENT

Patent Document

Patent Document 1: JP H03-038425 A

SUMMARY

In view of the foregoing problems, an object of the present disclosure is to provide a forced-ventilation device capable of not only saving a user from having to operate an associated-device but also ensuring security.

According to an aspect of the present disclosure, a forced-ventilation device performs forced ventilation of a compartment of a vehicle by actuating a blower of an air-conditioning device of the vehicle when the compartment is left at high temperature. The forced-ventilation device includes a mobile device, a control portion, and an opening and closing mechanism. The mobile device is used for a start entry system and carried around by a user. The control portion is mounted on the vehicle and locks or unlocks a door of the vehicle by transmitting a call signal to the mobile device through radio wave and by verifying a response signal which is transmitted from the mobile device through radio wave in response to the call signal. The opening and closing mechanism opens and closes a window of the door. When a mode for the forced ventilation has been set by the user, when the mobile device approaching the vehicle together with the user enters a predetermined detection area in which the response signal transmitted from the mobile device is detectable by the control portion, and when the control portion succeeds in verification of the response signal, the control portion turns on an ignition switch of the vehicle, opens the window by using the opening and closing mechanism, and commands the air-conditioning device to operate the blower.

The configuration as above uses the mobile device and the control portion which are used for the smart entry system. The control portion detects entry of the mobile device into the detection area by exchanging a call signal and a response signal through radio waves. When the mode for forced-ventilation has been set, and when the control portion succeeds in verification of the response signal, the control portion performs the forced ventilation by turning on the ignition switch, by opening the window of the vehicle using the opening and closing mechanism, and by operating the blower of the air-conditioning device.

Hence, the forced ventilation is automatically performed when the user carrying around the mobile device approaches the vehicle. Accordingly, the user is not required to take out the mobile device from a pocket or a bag and manually operate the mobile device. The user can be thus saved from having to operate the mobile device.

Because the window is opened when the forced ventilation is performed, the compartment is ventilated effectively. In addition, because the user is within the detection area about the vehicle, even when the window is open, the forced-ventilation is taking place while the vehicle is in sight of the user. Hence, security can be assured.

DESCRIPTION OF EMBODIMENTS

Figure 1:
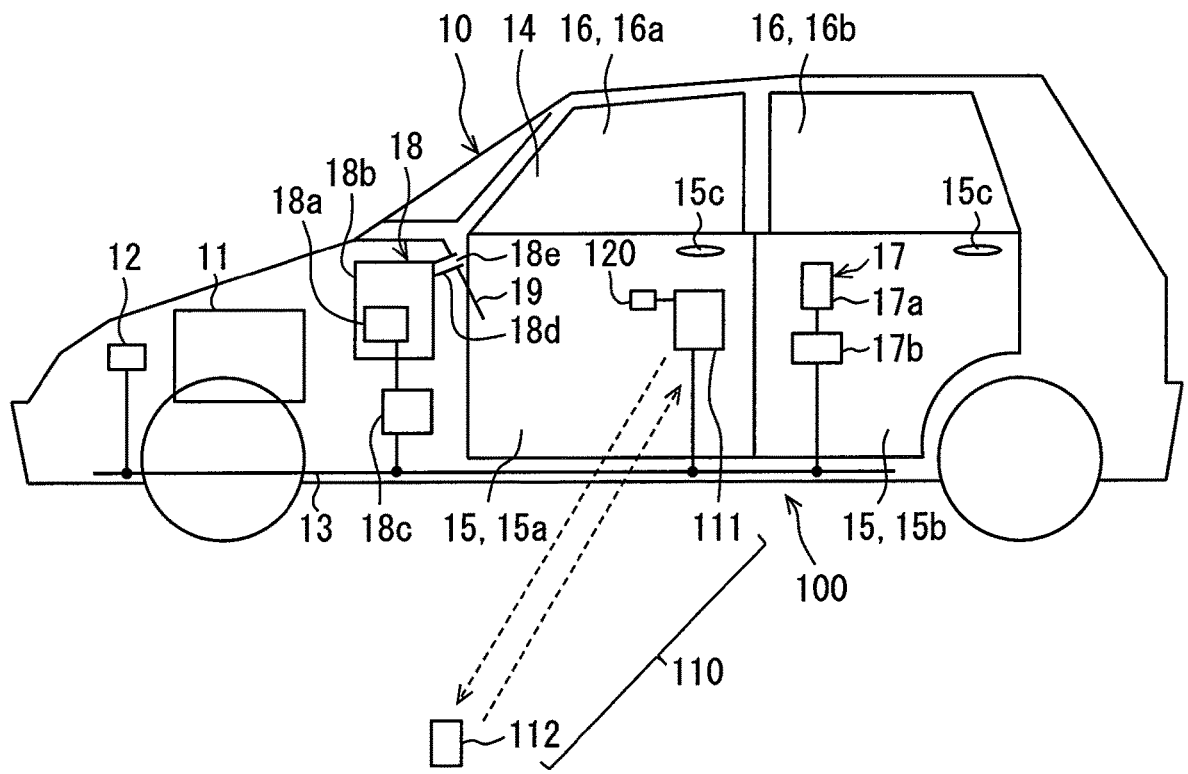
FIG. 1 is a schematic view of a forced-ventilation device according to a first embodiment of the present disclosure.

Hereinafter, multiple embodiments for implementing the present invention will be described referring to drawings. In the respective embodiments, a part that corresponds to a matter described in a preceding embodiment may be assigned the same reference numeral, and redundant explanation for the part may be omitted. When only a part of a configuration is described in an embodiment, another preceding embodiment may be applied to the other parts of the configuration. The parts may be combined even if it is not explicitly described that the parts can be combined. The embodiments may be partially combined even if it is not explicitly described that the embodiments can be combined, provided there is no harm in the combination.

First Embodiment

A forced-ventilation device 100 of a first embodiment will be described using FIG. 1 through FIG. 3. The forced-ventilation device 100 of the first embodiment is a device which forcibly ventilates a compartment 14 of a vehicle 10 by actuating a blower 18a of a vehicle air-conditioning device 18, for example, when the compartment 14 is left at a high temperature. In the forced-ventilation device 100, a power window device 17 and the air-conditioning device 18 are associated with a smart entry system 110 which locks and unlocks doors 15 of the vehicle 10 and a time-counting timer 120.

Figure 2:
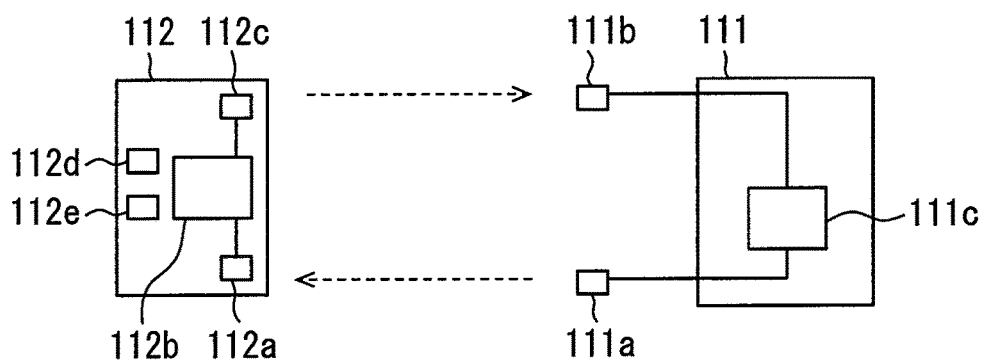
FIG. 2 is a schematic view of a vehicle-side main body portion and a mobile device in a smart entry system of the first embodiment.

As is shown in FIG. 1, the vehicle 10 is, for example, an engine vehicle equipped with an engine 11 as a running drive source. A driver's seat of the vehicle 10 is set on a right side of the vehicle, that is, the vehicle 10 is so-called a right-side steering vehicle. When an ignition switch 12 for power activation is switched ON, power is supplied from a vehicle battery to the engine 11 and other devices described below.

The ignition switch 12 is connected to a compartment network bus 13 represented by, for example, LIN (Local Interconnect Network) and CAN (Controller Area Network, registered trademark). Alternatively, the ignition switch 12 may be connected to the compartment network bus 13 via, for example, an ignition switch control portion.

For the user to get in and out from the vehicle 10, the vehicle 10 is provided with the doors 15 including front-seat-side doors 15a (hereinafter, referred to as the front doors 15a) on right and left sides (driver's seat and front passenger seat sides, respectively) and backseat-side doors 15b (hereinafter, referred to as the rear doors 15b) on the right and left sides. In short, the vehicle 10 is a four-door vehicle. Door handles 15c are provided to the respective doors 15a and 15b and used as handgrips when opening and closing the doors 15a and 15b. Vertically openable windows (glass windows) 16 are provided to the respective doors 15b. The windows 16 include front-seat side windows 16a (hereinafter, referred to as the front windows 16a) provided to the front doors 15a and backseat-side windows 16b (hereinafter, referred to as the rear windows 16b) provided to the rear doors 15b. Hence, as with the doors 15a and 15b, a total of the four windows 16a and 16b are provided on front, rear, right, and left sides.

The power window device 17 may be used as an example of an opening and closing mechanism which opens and closes the windows 16a and 16b by rolling up and down the windows 16a and 16b. The power window device 17 includes a window motor 17a rolling up and down the windows 16a and 16b and a body ECU 17b controlling an operation of the window motor 17a. The window motor 17a is provided to each of the doors 15a and 15b to have a one-to-one correspondence with the windows 16a and 16b. The body ECU 17b is connected to the compartment network bus 13.

The air-conditioning device 18 is a device which provides air conditioning to the compartment 14 of the vehicle 10, and is installed on an inner side of an instrument panel 19 in the compartment 14. The air-conditioning device 18 includes the blower 18a, an air-conditioning portion 18b, and an air-conditioning ECU 18c, and so on.

The blower 18a is a device which includes a fan and a motor and introduces air (inside air) in the compartment 14 or ambient air (outside air) of the vehicle 10 into the air-conditioning portion 18b to blow air into the compartment 14 via a fan duct 18d provided downstream of the air-conditioning portion 18b and an air outlet 18e opening to the compartment 14. The air outlet 18e is provided to the instrument panel 19.

The air-conditioning portion 18b is a device which includes a cooling heat exchanger provided to a refrigeration cycle device in which a refrigerant is circulated and a heating heat exchanger provided to a heater circuit in which an engine coolant is circulated, and regulates a temperature of blown air at a pre-set temperature set by the user by cooling or heating air blown from the blower 18a.

The air-conditioning ECU 18c is an air-conditioning control portion which controls operations of the blower 18a and the air-conditioning portion 18b described above. The air-conditioning ECU 18c is connected to the compartment network bus 13.

The air-conditioning device 18 is provided with an air-conditioning switch to actuate the refrigeration cycle device (cooling operation) and an inside and outside air selector switch to introduce either inside air or outside air.

The smart entry system 110 is a system which allows the user to lock and unlock the doors 15a and 15b without the user having to directly insert a key into key cylinders of the doors 15a and 15b and further without having to manually operate a mobile device 112. As are shown in FIG. 1 and FIG. 2, the smart entry system 110 includes a vehicle-side main body portion 111 and the mobile device 112. The ignition switch 12, the power window device 17, and the air-conditioning device 18 operate in association with the smart entry system 110.

The vehicle-side main body portion 111 is provided to the vehicle 10 and includes a main body transmission portion 111a, a main body reception portion 111b, a main body control portion 111c, and so on.

The main body transmission portion 111a is a transmission portion which uses an LF (Low Frequency) wave as a long wave and transmits a call signal to the mobile device 112 present inside (compartment 14) or outside the vehicle 10 by wireless communications (radio wave communications). The main body transmission portion 111a is provided as a transmission antenna from which a call signal is transmitted. The main body transmission portion 111a is provided to, for example, each of the right and left front doors 15a. A call signal from the main body transmission portion 111a does not require an external trigger and is transmitted intermittently (at predetermined transmission intervals) while the vehicle is parked.

The main body reception portion 111b is a reception portion which receives a response signal transmitted from the mobile device 112 through an RF (Radio Frequency) wave as a high-frequency wave. The main body reception portion 111b is provided as a reception antenna at which a response signal is received. The main body reception portion 111b is capable of receiving a response signal from the mobile device 112 present inside (compartment 14) or outside the vehicle 10. The main body reception portion 111b outputs the received response signal to the main body control portion 111c.

The main body control portion 111c is a control portion which outputs a call signal to the mobile device 112 via the main body transmission portion 111a and receives a response signal from the mobile device 112 via the main body reception portion 111b. The main body control portion 111c corresponds to a control portion of the present disclosure. The main body control portion 111c is connected to the compartment network bus 13.

The doors 15a and 15b are locked or unlocked by the main body control portion 111c. Upon receipt of a response signal from the mobile device 112 within a detection area, the main body control portion 111c verifies the received response signal against an authentication signal preliminarily registered in the main body control portion 111c. When the main control portion 111c succeeds in verification of the response signal and the user operates a door handle 15c by touching the door handle 15c or the like, the main body control portion 111c outputs a lock or unlock command to locking mechanisms of the respective doors 15a and 15b. An operation on the door handle 15c, such as touching, includes operations to touch a predetermined portion of the door handle 15c, grip the door handle 15c, and so on.

The detection area referred to herein means a region within which the mobile device 112 (mobile control portion 112b) is capable of responding to a call signal from the main body transmission portion 111a, in other words, a region within a reach of an inquiry signal from the main body transmission portion 111a. More specifically, the detection area is a region chiefly facing the (right and left) front doors 15a each provided with the main body transmission portion 111a over a distance (for example, about 5 m to 10 m) short enough for the user carrying around the mobile device 112 to approach the vehicle 10 with the vehicle in sight of the user.

Meanwhile, the mobile device 112 is a mobile key carried around by the user, and includes a mobile reception portion 112a, the mobile control portion 112b, a mobile transmission portion 112c, a lock button 112d, an unlock button 112e, and so on.

The mobile reception portion 112a is a reception portion which receives a call signal transmitted from the main body transmission portion 111a and outputs the received call signal to the mobile control portion 112b described below. The mobile reception portion 112a is provided as a reception antenna at which a call signal is received.

The mobile control portion 112b is a control portion which outputs a response signal necessary to verify the call signal inputted from the mobile reception portion 112a to the mobile transmission portion 112c. Upon receipt of an input signal due to a depressing operation on either the lock button 112d or the unlock button 112e or both, the mobile control portion 112b outputs a request signal corresponding to the received input signal to the main body control portion 111c (a detailed description will be given below).

The mobile transmission portion 112c is a transmission portion which transmits a response signal or a request signal from the mobile control portion 112b to the main body reception portion 111b. The mobile transmission portion 112c is provided as an antenna from which a response signal or a request signal is transmitted.

The lock button 112d is an input portion which performs an input to lock the doors 15 independently of a call signal whenever depressed by the user. More specifically, the lock button 112d generates a door-lock request signal requesting to lock (fasten) the doors 15 and outputs the generated signal to the mobile control portion 112b. The door-lock request signal is transmitted from the mobile control portion 112b to the main body control portion 111c.

As with the lock button 112d, the unlock button 112e is an input portion which performs an input to unlock the doors 15 independently of a call signal whenever depressed by the user. More specifically, the unlock button 112e generates a door-unlock request signal requesting to unlock (unfasten) the doors 15 and outputs the generated signal to the mobile control portion 112b. The door-unlock request signal is transmitted from the mobile control portion 112b to the main body control portion 111c.

Basically, the buttons 112d and 112e are buttons either one of which is selected and depressed depending on a request to be issued. However, apart from the usage as above, in the present embodiment, the buttons 112d and 112e are capable of generating a forced-ventilation request signal to perform forced ventilation and outputting the generated signal to the mobile control portion 112b when operated in a manner different from an originally intended depressing operation. The forced-ventilation request signal is transmitted from the mobile control portion 112b to the main body control portion 111c.

An operation in a manner different from an originally intended depressing operation to generate a forced-ventilation request signal is to, for example, depress both of the two buttons 112d and 112e at a same time, depress the two buttons 112d and 112e one after the other, and so on.

The timer 120 is time counting means for counting an operating time of the blower 18a during a forced-ventilation control described below and connected to the main body control portion 111c.

An operation of the forced-ventilation device 100 configured as above will now be described by also referring to a flowchart of FIG. 3. The flowchart of FIG. 3 depicts a control content performed by the main body control portion 111c.

When the user determines that forced ventilation is necessary particularly in summertime, the user sets a forced-ventilation mode in advance by depressing the two buttons 112d and 112e provided to the mobile device 112. For example, the user depresses the two buttons 112d and 112e at a same time or depresses the two buttons 112d and 112e one after the other. A forced-ventilation request signal is thus generated and transmitted from the mobile control portion 112b to the main body control portion 111c in advance.

Figure 3:
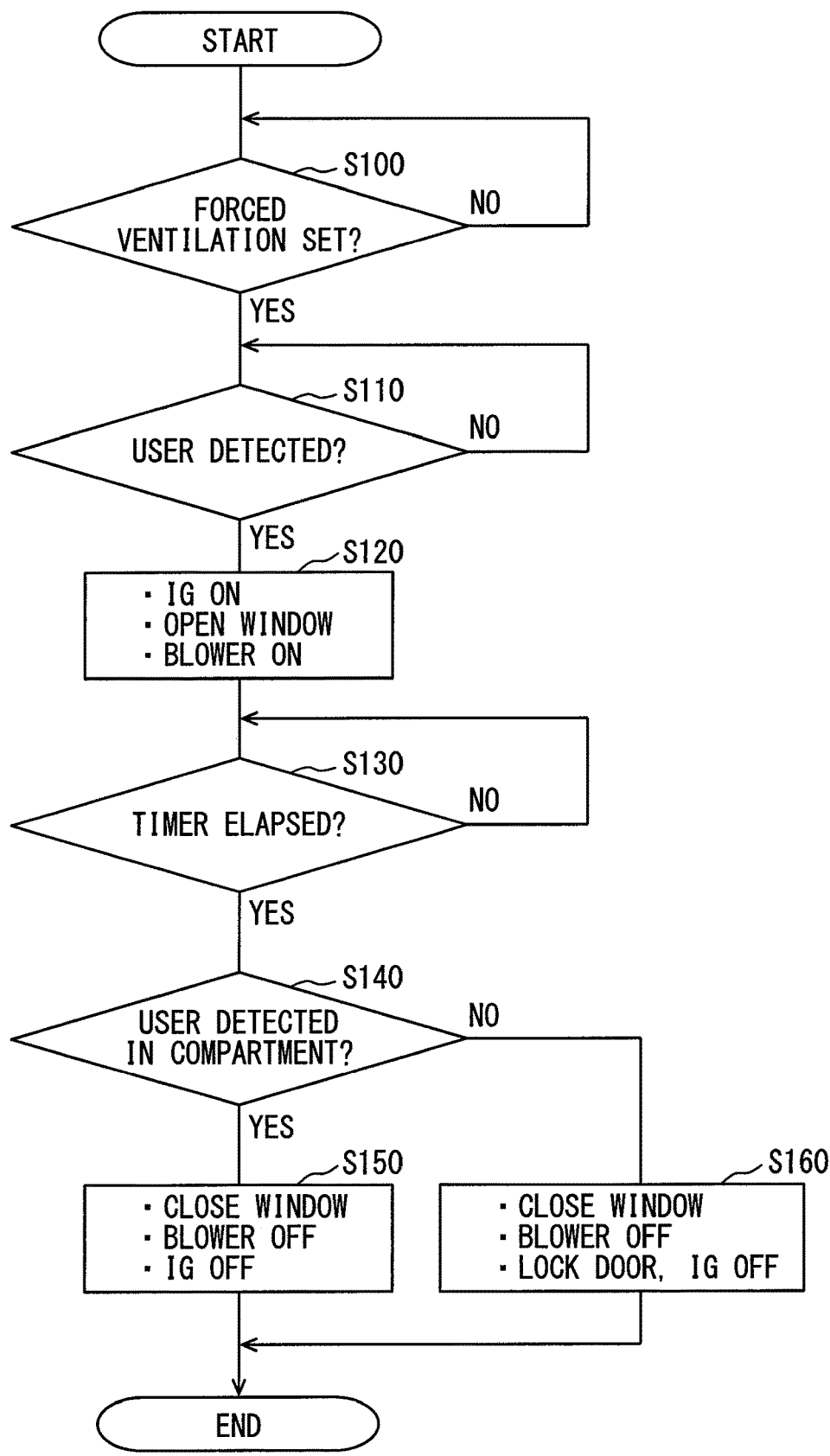
FIG. 3 is a flowchart depicting control processing performed by a main body control portion of the first embodiment.

Once the forced-ventilation mode is set, the forced-ventilation control is performed in accordance with a control flow depicted in FIG. 3. The forced-ventilation mode is performed in a situation, for example, where the user, who has finished an errand, is approaching the vehicle 10 parked in a parking lot under the hot sun to drive the vehicle again.

Firstly, the main body control portion 111c determines in Step S100 whether the forced-ventilation mode is set. When the main body control portion 111c determines that the forced-ventilation mode is set, the main body control portion 111c proceeds to Step S110. When a determination made in Step S100 is negative, the main body control portion 111c repeats Step S100.

In Step S110, the main body control portion 111c determines whether the user is detected. More specifically, the main body control portion 111c determines whether the mobile device 112 carried around by the user is detected within the detection area according to a response signal from the mobile device 112. Further, the main body control portion 111c determines whether verification of the response signal is successful.

That is, the main body control portion 111c transmits a call signal intermittently while the vehicle 10 is parked. When the user enters the detection area, the mobile device 112 becomes capable of detecting a call signal and transmits a response signal to the main body control portion 111c in response to the call signal. The main body control portion 111c thus confirms presence of the mobile device 112 within the detection area. Upon confirmation of the presence, the main body control portion 111c verifies the response signal against the authentication signal registered in itself. When verification of the response signal is successful, the main body control portion 111c identifies the detected mobile device 112 as the authentic mobile device 112 set to the vehicle 10.

When a determination made in Step S110 is positive, that is, when the mobile device 112 is detected and authenticated, the main body control portion 111c proceeds to Step S120. When the determination is negative, the main body control portion 111c repeats Step S110.

In Step S120, the main body control portion 111c performs forced ventilation by switching ON the ignition switch 12, opening the windows 16, and actuating the blower 18a. More specifically, the main body control portion 111c outputs an ignition switch ON command directly to the ignition switch 12 in a case where the ignition switch 12 is connected to the main body portion 111c via the compartment network bus 13 or to an ignition switch control portion in a case where the ignition switch control portion is separately provided.

The main body control portion 111c also outputs a command to open the windows 16 to the body ECU 17b connected to the main body control portion 111c via the compartment network bus 13. The windows 16 to be opened are, for example, the rear windows 16b. The rear windows 16b are opened at a predetermined opening degree set in advance.

The main body control portion 111c also outputs a command to actuate the blower 18a to the air-conditioning ECU 18c connected to the main body control portion 111c via the compartment network bus 13. The blower 18a operates, for example, at full power with application of a MAX voltage. The blower 18a is actuated regardless of whether an air-conditioning switch of the air-conditioning device 18 is ON or OFF and whether the inside and outside air selector switch is switched to inside air or outside air. The main body control portion 111c starts to count a time by using the timer 120 when the blower 18a is actuated.

In subsequent Step S130, the main body control portion 111c determines whether the timer 120 counts to a predetermined time. More specifically, the main body control portion 111c determines whether the time counted by the timer 120, that is, an operating time of the blower 18a exceeds a predetermined time. When a determination made in Step S130 is positive, the main body control portion 111c proceeds to Step S140. When the determination is negative, the main body control portion 111c repeats Step S130.

In Step S140, the main body control portion 111c determines whether the user (mobile device 112) is detected in the compartment 14. More specifically, the main body control portion 111c determines whether the mobile device 112 is in the compartment 14 depending on whether the mobile device 112 has responded to a call signal transmitted inside the compartment 14. A content of the determination above indicates whether the user approaches the vehicle 10, unlocks the doors 15 by touching the door handle 15c, and gets in the vehicle 10.

When a determination made in Step S140 is positive, the main body control portion 111c proceeds to Step S150 and ends the forced ventilation by closing the windows 16, stopping the blower 18a, and switching OFF the ignition switch 12. More specifically, the main body control portion 111c performs a process in Step S150 by outputting a command to close the windows 16 to the body ECU 17b, outputting a command to stop the blower 18a to the air-conditioning ECU 18c, and outputting an OFF command to the ignition switch 12 (or the ignition switch control portion).

Meanwhile, when a determination made in Step S140 is negative, the main body control portion 111c proceeds to Step S160 and closes the windows 16, stops the blower 18a, locks the doors 15, and switches OFF the ignition switch 12. The windows 16 are closed, the blowers 18a is stopped, and the ignition switch 12 is switched OFF in the same manner as in Step S150 above.

The doors 15 are locked as one of the controlled operations described above. That is, in a case where the user back in the compartment 14 remembers, for example, another errand and gets out of the vehicle, the doors 15 may possibly be left unlocked. Hence, the main body control portion 111c locks the doors 15. In a case where the user remembers another errand while approaching the vehicle 10 and leaves again without getting in the vehicle 10, the doors 15 are not unlocked (remain locked). In such a case, the main body control portion 111c maintains the doors 15 in a locked state.

As has been described above, the present embodiment uses the mobile device 112 and the main body control portion 111c included in the smart entry system 110. The main body control portion 111c detects when the mobile device 112 enters the detection area by exchanging a call signal and a response signal through radio waves. In a case where verification of the response signal is successful under a condition that the forced-ventilation mode is set in advance, the main body control portion 111c performs forced ventilation by switching ON the ignition switch 12, opening the windows 16 of the vehicle 10 by using the power window device 17, and actuating the blower 18a of the air-conditioning device 18.

Hence, forced ventilation is automatically performed when the user carrying around the mobile device 112 approaches the vehicle 10. Accordingly, the user is not required to manually operate the mobile device 112 by taking out the mobile device 112 from a pocket or a bag. The user is thus saved from having to operate the mobile device 112.

Because the windows 16 are opened when forced ventilation is performed, the compartment 14 is ventilated effectively. In addition, because the user is within the detection area about the vehicle 10, even when the windows 16 are open, forced-ventilation is taking place in the vehicle 10 in sight of the user. Hence, security can be assured.

Moreover, the windows 16 opened during forced ventilation are the rear windows 16b of the vehicle 10 in the present embodiment. Normally, the air outlet 18e of the air-conditioning device 18 in the vehicle 10 is provided to a front part (instrument panel 19) in the compartment 14. Hence, by setting the windows 16 to be opened to the rear windows 16b, blown air flows from front to rear in the compartment 14 and flows out from the rear windows 16b. The entire compartment 14 can be thus ventilated effectively.

In the preset embodiment, the timer 120 counting an operating time of the blower 18a is included. When an operating time of the blower 18a counted by the timer 120 exceeds a predetermined time set in advice, the main body control portion 111c closes the opened windows 16, stops the blower 18a, and switches OFF the ignition switch 12.

In the manner as above, forced ventilation can be automatically stopped by counting a time using the timer 120. In addition, unwanted power consumption of the battery can be restricted by switching OFF the ignition switch 12.

In the present embodiment, the main body control portion 111c sets the doors 15 in a locked state unless the mobile deice 112 is detected in the compartment 14 even when an operating time of the blower 18a counted by the timer 120 exceeds a predetermined time.

According to the configuration as above, when the mobile device 112 enters the detection area, unless the mobile device 112 is detected in the compartment 14 before a predetermined time elapses, it is determined that the user approaches the vehicle but does not get in the vehicle 10. In such a case, a security problem is forestalled by setting the doors 15 in a locked state (maintaining a locked state).

Second Embodiment

Figure 4:
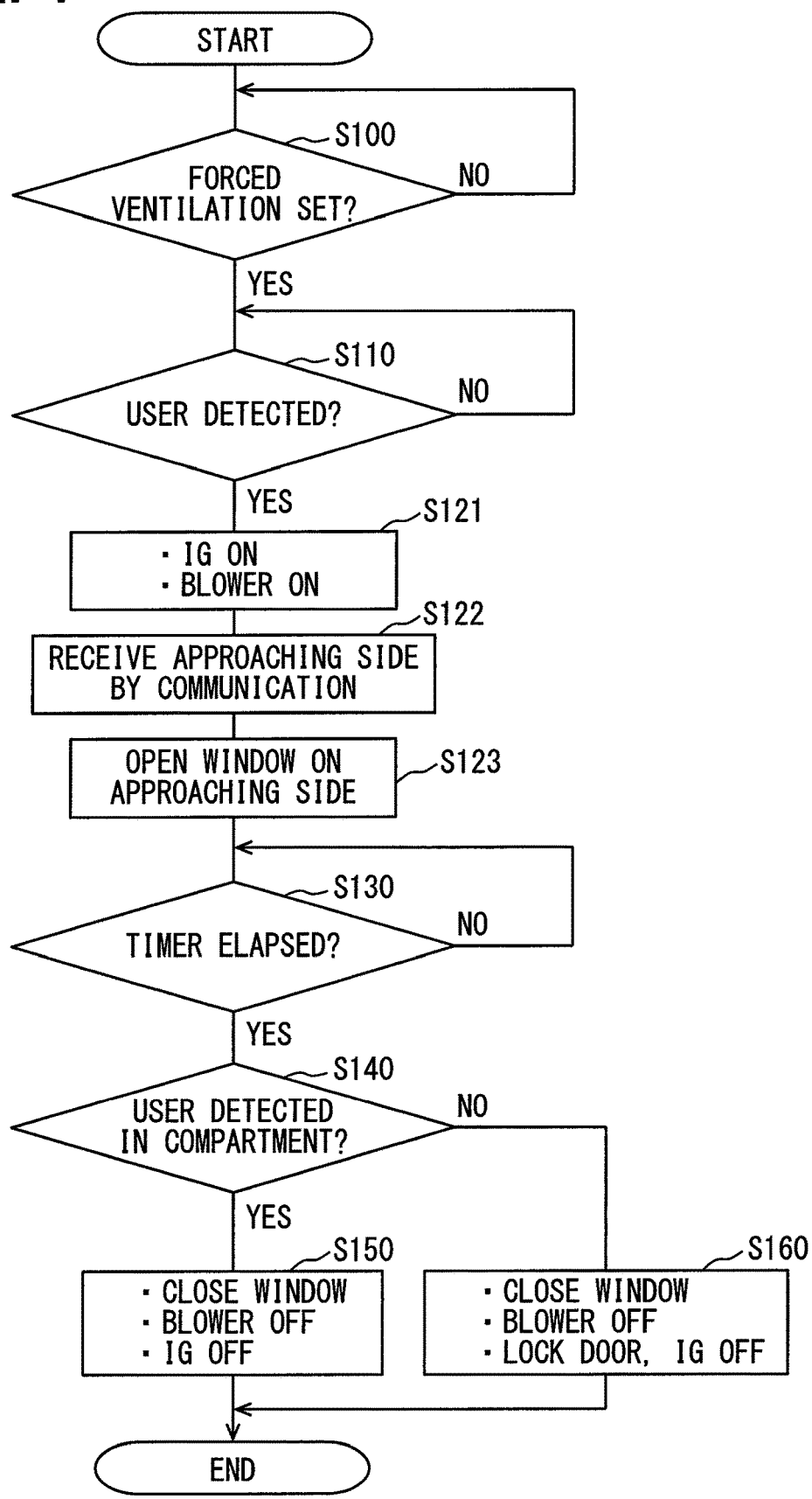
FIG. 4 is a flowchart depicting control processing performed by a main body control portion according to a second embodiment of the present disclosure.

A second embodiment is shown in FIG. 4. The present embodiment is different from the first embodiment above in that from which side of a vehicle 10 a user is approaching can be found out and a window 16 on the approaching side is opened when forced ventilation is performed. In a flowchart of FIG. 4, Step S120 of FIG. 3 described in the first embodiment above is changed to Steps S121, S122, and S123.

When it is determined in Step S110 that a mobile device 112 is within a detection area and verification of a response signal is successful, a main body control portion 111c proceeds to Step S121 and quickly starts forced ventilation by switching ON an ignition switch 12 and actuating a blower 18a first.

In Step S122, the main body control portion 111c finds out whether the user is approaching the vehicle 10 from a right side or a left side by transmitting a call signal alternately to a right outside portion (outside on a driver's seat side) and a left outside portion (outside on a front passenger seat side) from main body transmission portions 111a provided to right and left front doors 15a. That is, in a case where the mobile device 112 responds to a call signal transmitted from one of the right and left front doors 15a, for example, the front right door 15a, it is found that the user is approaching from the right side of the vehicle 10. Conversely, in a case where the mobile device 112 responds to a call signal transmitted from the other one of the right and left front doors 15a, that is, the left front door 15a, it is found that the user is approaching from the left side of the vehicle 10.

In subsequent Step S123, the main body control portion 111c opens the window 16 on the side the user is approaching. Either a front window or a rear window on the user approaching side can be opened. However, it is preferable to open a rear window 16b.

Owing to the configuration as above, the window on the user approaching side is opened when forced ventilation is performed, which enables the user to confirm that ventilation is taking place with own eyes. Even when a third party is approaching the open window, the user can take an action immediately when the user spots the third party with own eyes. Consequently, security can be assured further.

Third Embodiment

Figure 5:
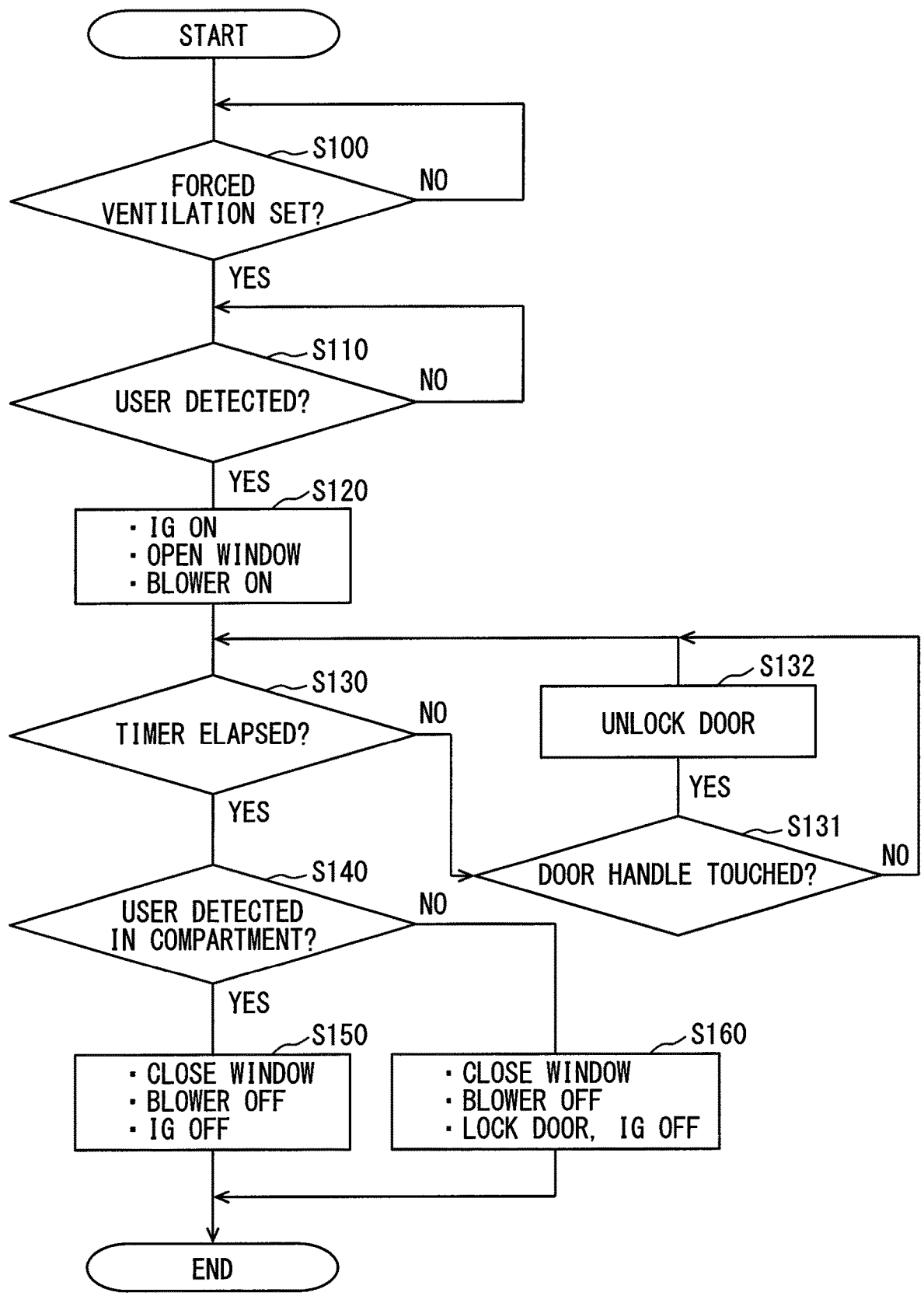
FIG. 5 is a flowchart depicting control processing performed by a main control portion according to a third embodiment of the present disclosure.

A third embodiment is shown in FIG. 5. The present embodiment is different from the first embodiment above in that doors 15 are unlocked without stopping an operation of a blower 18a in response to an operation by a user requesting to unlock the doors 15 while the blower 18a is actuated under forced ventilation. In a flowchart of FIG. 5, Steps S131 and S132 are added to the flowchart of FIG. 3 described in the first embodiment above.

More specifically, when a main body control portion 111c proceeds to Step S130 from Step S120 and determines that an operating time of the blower 18a counted by a timer 120 does not exceed a predetermined time, the main body control portion 111c proceeds to Step S131 and determines whether the user has made an operation on a door handle 15c by touching the door handle 15c or the like (unlock requesting operation for the doors 15).

When a determination made in Step S131 is positive, the main body control portion 111c unlocks the doors 15 in Step S132 without stopping an operation of the blower 18a and returns to Step S130.

Owing to the configuration as above, even when forced ventilation is taking place (while the blower 18a is operating), the doors 15 are unlocked in response to an unlock requesting operation. Hence, the user can get in a vehicle 10 quickly.

Fourth Embodiment

Figure 6:
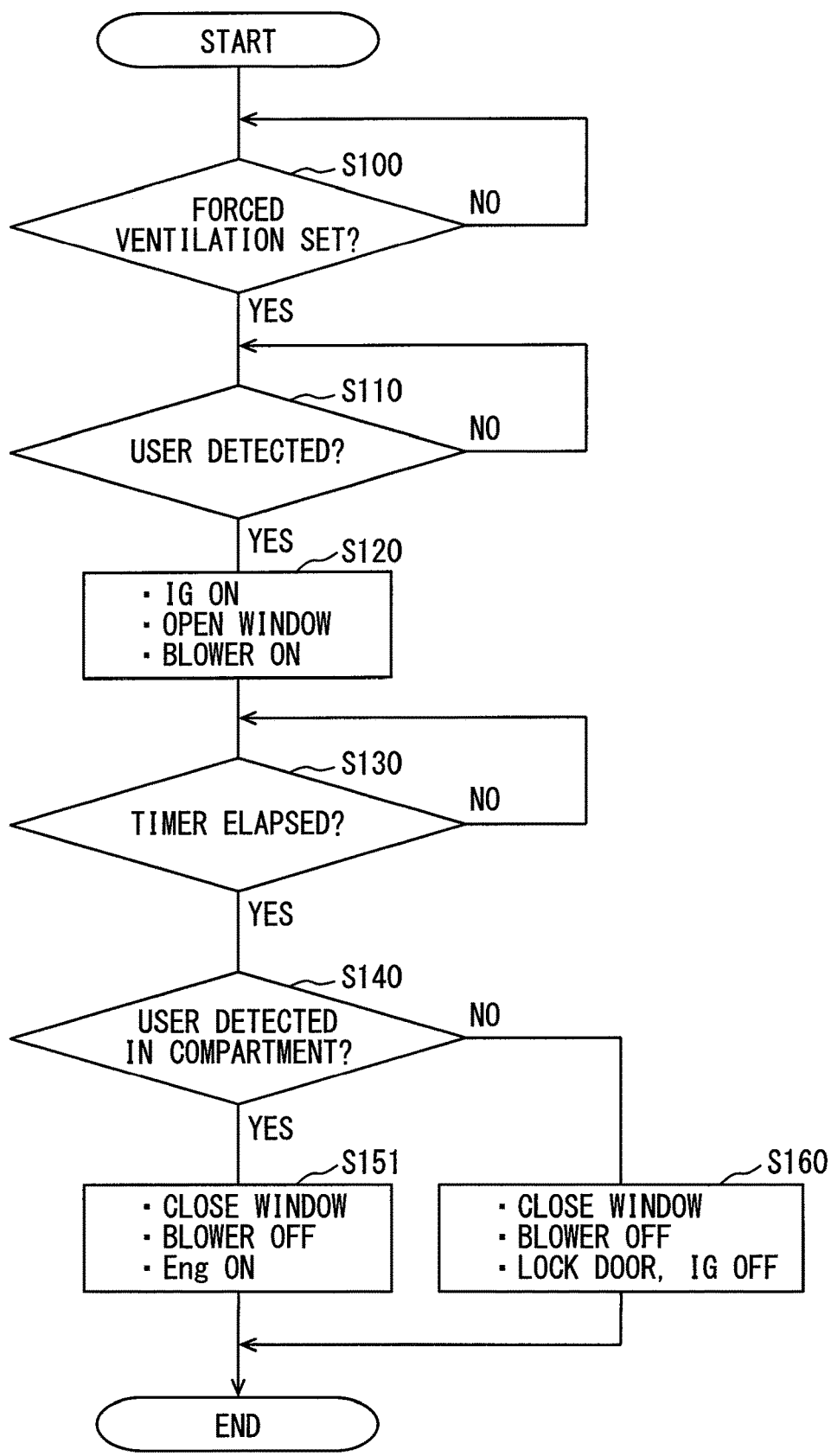
FIG. 6 is a flowchart depicting control processing performed by a main control portion according to a fourth embodiment of the present disclosure.

A fourth embodiment is shown in FIG. 6. The present embodiment is different from the first embodiment above in that an engine 11 is started when a mobile device 112 is detected in a compartment 14 after a blower 18a is actuated for a predetermined time under forced ventilation. In a flowchart of FIG. 6, Step S150 of FIG. 3 described in the first embodiment above is changed to Step S151.

In the present embodiment, a main body control portion 111c is associated with a start switch used to start the engine 11. The engine 11 can be started when the main body control portion 111c requests the start switch to start the engine 11.

When the main body control portion 111c determines in Step S130 that an operating time of the blower 18a exceeds a predetermined time, the main body control portion 111c proceeds to Step S140 and determines whether a user (mobile device 112) is detected in the compartment 14.

When a determination made in Step S140 is positive, the main body control portion 111c proceeds to Step S151 and ends the forced ventilation by closing windows 16 and stopping the blower 18a and starts the engine 11.

Owing to the configuration as above, forced ventilation is automatically ended when a predetermined time elapses after the blower 18a is actuated. Further, when the mobile device 112 is detected in the compartment 14, it is determined that the user is seated in a vehicle 10. By staring the engine 11 in circumstances as above, the user can start to drive the vehicle 10 immediately. That is, driving can be started smoothly after forced ventilation is performed and ended.

The respective embodiments above have described that the lock button 112d and the unlock button 112e provided to the mobile device 112 are used as input means for setting the forced-ventilation mode. However, a dedicated mechanical switch provided to a vehicle operation panel or the like in the instrument panel 19 or a touch switch on a vehicle information display screen may be used instead. Further, a terminal connected to the main body control portion 111c may be used as well.

The respective embodiments above have described that the main body transmission portion 111a is provided to each of the right and left front doors 15a. However, the main body transmission portion 111a may be also provided to each of the right and left rear doors 15b and further to a rear trunk or the like. When configured in such a manner, the user (the mobile device 112) approaching the vehicle can be detected over a broader range.

Alternatively, the main body transmission portion 111a may be provided to each of the right and left front doors 15a and the right and left rear doors 15b and further to the rear trunk from the start and the user may select which main body transmission portion(s) 111a is enabled when the user initially sets the forced-ventilation mode.

The respective embodiments above have described that the window(s) to be opened when forced-ventilation is performed is the rear window(s) 16b. However, the present disclosure is not limited to the configuration as above. The front window(s) 16a may be opened depending on a ventilation performance of the blower 18a or a region of the compartment 14 that needs ventilation. Further, the windows to be opened may be a combination of the rear window 16b and the front window 16a (another window).

Alternatively, the user may select which window(s) is to be opened when the user initially sets the forced-ventilation mode.

The respective embodiments above have described that the window(s) 16 is opened at a predetermined opening degree when forced ventilation is performed. The predetermined opening degree means an opening degree of arbitrary magnitude, such as a low opening degree, a medium opening degree, and a high opening degree. The user may set magnitude of an opening degree when the user initially sets the forced-ventilation mode.

The respective embodiments above have described that an applied voltage to the blower 18a actuated under forced ventilation is a MAX voltage. However, the present disclosure is not limited to the configuration as above and an applied voltage may be an arbitrary voltage.

While the present disclosure has been described with reference to embodiments thereof, it is to be understood that the disclosure is not limited to the embodiments and constructions. To the contrary, the present disclosure is intended to cover various modification and equivalent arrangements. In addition, while the various elements are shown in various combinations and configurations, which are exemplary, other combinations and configurations, including more, less or only a single element, are also within the spirit and scope of the present disclosure.

What is claimed is:

1. A forced-ventilation device performing forced ventilation of a compartment of a vehicle by actuating a blower of an air-conditioning device of the vehicle when the compartment is left at high temperature, the forced-ventilation device comprising:
    a mobile device used for a start entry system and carried around by a user;
    a control portion mounted on the vehicle and locking or unlocking a door of the vehicle by transmitting a call signal to the mobile device through radio wave and by verifying a response signal which is transmitted from the mobile device through radio wave in response to the call signal; and
    an opening and closing mechanism opening and closing a window of the door, wherein
    when a mode for the forced ventilation has been set by the user, when the mobile device approaching the vehicle together with the user enters a predetermined detection area in which the response signal transmitted from the mobile device is detectable by the control portion, and when the control portion succeeds in verification of the response signal, the control portion turns on an ignition switch of the vehicle, opens the window by using the opening and closing mechanism, and commands the air-conditioning device to operate the blower,
    the control portion is capable of detecting whether the user is approaching the vehicle from a right outdoor space or a left outdoor space by transmitting the call signal alternately to the right outdoor space and the left outdoor space, and
    the window is positioned on a side of the vehicle the user is approaching.

2. The forced-ventilation device according to claim 1, wherein:
    the window is positioned on a backseat side of the vehicle.

3. The forced-ventilation device according to claim 1, further comprising a timer counting an operating time of the blower, wherein
    when the operating time counted by the timer exceeds a predetermined time, the control portion closes the window, stops the blower, and turns off the ignition switch.

4. The forced-ventilation device according to claim 3, wherein
    when the operating time counted by the timer has not reached the predetermined time, the control portion unlocks the door in response to a requesting operation by the user for unlocking the door while the control portion keeping the blower operating.

5. The forced-ventilation device according to claim 3, wherein
    when the operating time counted by the timer exceeds the predetermined time, and when the mobile device is not detected in the compartment, the control portion locks the door.

6. The forced-ventilation device according to claim 1, further comprising a timer counting an operating time of the blower, wherein
    when the operating time counted by the timer exceeds a predetermined time, and when the mobile device is detected in the compartment, the control portion closes the window, stops the blower, and starts a running drive source of the vehicle.

7. A forced-ventilation device performing forced ventilation of a compartment of a vehicle by actuating a blower of an air-conditioning device of the vehicle when the compartment is left at high temperature, the forced-ventilation device comprising:
    a mobile device used for a start entry system and carried around by a user;
    a control portion mounted on the vehicle and locking or unlocking a door of the vehicle by intermittently transmitting a call signal to the mobile device through radio wave and by verifying a response signal which is transmitted from the mobile device through radio wave in response to the call signal;
    an opening and closing mechanism opening and closing a window of the door; and
    a timer counting an operating time of the blower, wherein when a mode for the forced ventilation has been set by the user and when the control portion determines that the mobile device is within a predetermined detection area, the control portion turns on an ignition switch of the vehicle, opens the window by using the opening and closing mechanism, and commands the air-conditioning device to operate the blower, when the operating time counted by the timer exceeds a predetermined time, and when the mobile device is detected in the compartment, the control portion closes the window, stops the blower, and turns off the ignition switch, and when the operating time counted by the timer exceeds the predetermined time, and when the mobile device is not detected in the compartment, the control portion closes the window, stops the blower, locks the door, and turns off the ignition switch.

8. The forced-ventilation device according to claim 7, wherein the control portion intermittently transmits the call signal without any external trigger when the vehicle is parked.

9. A forced-ventilation device for performing a forced ventilation of a compartment of a vehicle by actuating a blower of an air conditioning device of the vehicle in response to a high temperature within the compartment, the forced-ventilation device comprising:

a mobile device for carrying by a user of the vehicle and configured to transmit a response signal to initiate the forced ventilation, the mobile device further configured to input a preset command for enabling an automatic forced ventilation;

a control portion mounted in the vehicle and configured to lock and unlock the door of the vehicle, the control portion further configured to intermittently transmit a call signal via radio wave to the mobile device and to receive and verify the response signal from the mobile device to determine whether the mobile device is within a predetermined area outside the vehicle or whether the mobile device is inside the vehicle;

an opening and closing mechanism configured to open and close a window of the door; and a timer configured to count an operating time of the blower, wherein in response to the preset command for enabling the automatic forced ventilation being input to the mobile device and in response to the control portion determining that the mobile device is within the predetermined detection area outside the vehicle, the control portion is further configured to automatically turn on an ignition switch of the vehicle, to open the window using the opening and closing mechanism, and to command the air conditioning device to operate the blower without any additional input to the mobile device, and wherein in response to the operating time counted by the timer exceeding a predetermined time and in response to the control portion determining the mobile device is within the vehicle, the control portion is further configured to close the window using the opening and closing mechanism, to command the air conditioning device to stop the blower, and to turn off the ignition switch, and wherein in response to the operating time counted by the timer exceeding the predetermined time and in response to the control portion determining the mobile device is not within the vehicle nor the predetermined detection area outside the vehicle, the control portion is further configured to close the window using the opening and closing mechanism, to command the air conditioning device to stop the blower, to lock the door, and to turn off the ignition switch.

\* \* \* \* \*